US012691582B2

(12) United States Patent
Yang et al.

(10) Patent No.: US 12,691,582 B2
(45) Date of Patent: Jul. 28, 2026

(54) MASTER-SLAVE TELEOPERATION ROBOT SYSTEM BASED ON FORCE MIXED REALITY

(71) Applicant: ZHEJIANG UNIVERSITY, Hangzhou city (CN)

(72) Inventors: Liangjing Yang, Hangzhou city (CN); Yunze Shi, Hangzhou city (CN); Xianhao Chen, Hangzhou city (CN); Tengyue Wang, Hangzhou city (CN); Haonan Mai, Hangzhou city (CN); Jiawei Yu, Hangzhou city (CN)

( * ) Notice: Subject to any disclaimer, the term of this patent is extended or adjusted under 35 U.S.C. 154(b) by 40 days.

(21) Appl. No.: 18/919,479

(22) Filed: Oct. 18, 2024

(65) Prior Publication Data

US 2025/0229427 A1 Jul. 17, 2025

(30) Foreign Application Priority Data

Jan. 16, 2024 (CN) .......................... 202410060256.5

(51) Int. Cl.
| | |
|---|---|
| *B25J 9/16* | (2006.01) |
| *B25J 3/00* | (2006.01) |
| *B25J 13/00* | (2006.01) |

(52) U.S. Cl.
CPC .............. *B25J 9/1689* (2013.01); *B25J 3/00* (2013.01); *B25J 9/1633* (2013.01); *B25J 9/1682* (2013.01); *B25J 9/1697* (2013.01); *B25J 13/006* (2013.01)

(58) Field of Classification Search
CPC . B25J 9/1689; B25J 3/00; B25J 9/1633; B25J 9/1682; B25J 9/1697; B25J 13/006; B25J 3/04; B25J 13/025; B25J 9/161; B25J 9/1612; B25J 9/1602; B25J 9/1628; B25J 9/1666; B25J 9/1676; B25J 19/021;
(Continued)

(56) References Cited

U.S. PATENT DOCUMENTS

| | | | |
|---|---|---|---|
| 2018/0232052 A1* | 8/2018 | Chizeck | .................. G06F 3/016 |
| 2022/0148458 A1* | 5/2022 | Hong | ..................... G16H 40/63 |
| 2024/0169550 A1* | 5/2024 | Azuma | ..................... G06T 7/74 |

FOREIGN PATENT DOCUMENTS

CN          115229789 A  * 10/2022  ................ B25J 9/16

OTHER PUBLICATIONS

Lee et al, "Implementation of Augmented Teleoperation System based on Robot Operating System (ROS)" 2018 IEEE/RSJ International Conference on Intelligent Robots and Systems (IROS) (Year: 2018).*

* cited by examiner

*Primary Examiner* — Esvinder Singh

(57) ABSTRACT

The invention pertains to a master-slave teleoperation robot system utilizing force mixed reality, relevant to teleoperation robot technology. The system consists of a master robot linked to a mixed reality device, which receives point cloud information to create a virtual environment. The slave robot features a depth camera that captures point cloud data from the real environment, transmitting it to the master robot in real time. This point cloud information generates a virtual fixture, which produces virtual force applied to the slave robot. The virtual force interacts with the actual environmental forces acting on the slave robot, guiding the operator's behavior at the master side. The system addresses incorrect occlusion between the real dynamic robot and the virtual scene by blending virtual and real elements. Through mixed reality with force guidance and feedback, it minimizes the risk of potentially harmful collisions during operations.

4 Claims, 4 Drawing Sheets

(58) Field of Classification Search
CPC ......... A61B 34/74; A61B 34/35; A61B 34/37;
A61B 34/76; G05B 2219/1215; G05B
2219/32014; G05B 2219/39449; G05B
2219/39451
See application file for complete search history.

MASTER-SLAVE TELEOPERATION ROBOT SYSTEM BASED ON FORCE MIXED REALITY

TECHNICAL FIELD

The invention relates to the field of teleoperation robot technology, in particular to a master-slave teleoperation robot system based on force mixed reality.

BACKGROUND ART

The master-slave teleoperation robot system is mainly operated in the way that the operator (master) controls the remote robot (slave) through the control system. This teleoperation system is usually used in the situations that require remote execution of tasks, such as dangerous environments, places that are inconvenient to enter, or application scenarios that require precise control. Master-slave teleoperation system can cover many fields, comprising but not limited to industrial application: in dangerous industrial environment, master-slave teleoperation system can be used to operate robot or perform high-precision tasks; medical application: in surgery, the master-slave teleoperation system can be used for remote surgery, which can reduce the need that the surgeon exposes to risk environment, and reduce the workload of doctor and improve the accuracy of surgery; adventure and exploration application: in the deep sea, space and other environments, the master-slave teleoperation system can be used to control the detector or robot and perform various tasks; military application: the master-slave teleoperation system is also widely used in the military field to perform dangerous tasks, such as bomb removal, reconnaissance, etc.

The design goal of this teleoperation system is to provide sufficient feedback and perception when the remote control is achieved, so as to ensure the accuracy and safety of the operation. The feedback provided for teleoperation is concentrated on vision and force sensing. The existing master-slave teleoperation systems mainly focus on vision, if only relying on a two-dimensional screen for visualization, the operator will face the challenge that it is difficult to observe the depth information of the slave environment. Although the three-dimensional visualization effect can be enhanced by applying mixed reality technology, the difficult problem faced by mixed reality is that it lacks the force feedback and guidance ability, and it is possible that there is incorrect virtual and real occlusion relationship. In terms of force sensing, the interaction force between the slave robot and the environment can be effectively fed back through the combination of a reasonable teleoperation algorithm and a slave force sensor. However, in the absence of the contact between the slave robot and the environment, the system lacks the guidance and restriction on the operator, which is difficult to ensure the safety of the operation.

To this end, the invention aims to provide a master-slave teleoperation robot system based on force mixed reality to solve the above problems.

SUMMARY OF THE INVENTION

To solve the above problems, the invention provides a master-slave teleoperation robot system based on force mixed reality, which solves the incorrect occlusion relationship between the real dynamic robot and the virtual scene projected in the mixed reality device through the combination of virtual and real, and the invention avoids the potential harmful collision risk in the operation process through the mixed reality with the force guidance and feedback.

In order to achieve the above purpose, the technical scheme of the invention is as follows:

The invention provides a master-slave teleoperation robot system based on force mixed reality, comprising a master robot and a slave robot.

The master robot is connected with a mixed reality device, which is used to receive information and produce a virtual environment in a mixed reality device.

An end of the slave robot is equipped with a depth camera, the depth camera is used to collect point cloud information of a real environment and send the information to the mixed reality device at the master side in real time, the point cloud information is used to produce a virtual fixture, the virtual fixture is used to produce a virtual force which is applied to the slave robot, the virtual force comprises a guiding force and a prohibiting force, the virtual force interacts with an actual environment interaction force of the slave robot to guide and norm the operator's behavior at the master side.

In this scheme, the point cloud information of the real environment is collected by the depth camera during an actual operation process, and sent to the mixed reality device in real time to produce the virtual environment. At the same time, the point cloud information is also used to produce the virtual fixture to produce the guiding force and the prohibiting force which are applied to the slave robot, this virtual force interacts with the actual environmental interaction force at the slave side to guide and norm the operator's behavior at the master side. The point cloud information represents the real environment collected by the depth camera. After the point cloud information is transformed to a base coordinate system of slave robot, it is sent to the master robot in real time. The master robot and the slave robot are in an isomorphic master-slave configuration, therefore, in the mixed reality device, the point cloud information can be projected directly to the corresponding position in the base coordinate of the master robot. In this configuration, the virtual environment at the master side corresponds to the real environment at the slave side, and the force guidance of the virtual fixture also corresponds to the visual feedback of the mixed reality. This consistency greatly enhances operator's immersion in a process of master-slave teleoperation.

The virtual fixture comprises a forbidden-region virtual fixture (FRVF) and a guidance virtual fixture (GVF), through an artificial potential field, the point cloud information of a prohibited area of the real environment is collected to produce the forbidden-region virtual fixture (FRVF); the guidance virtual fixture (GVF) is a human-robot interaction motion path that the operator wants to achieve.

In this scheme, the virtual fixture refers to a virtual tool created in a computer simulation environment, which is used to simulate the clamping and positioning functions in the actual scene. The point cloud information is the three-dimensional information of the real environment collected by the depth camera. After transformed to the base robot coordinate system, the point cloud information is sent to the master side in real time, the master robot and the slave robot are in an isomorphic master-slave configuration, therefore, in the mixed reality device, the point cloud information can be directly projected to the corresponding position in the base coordinate of the master robot.

The coordinate system of the master-slave teleoperation robot system comprises the base coordinate system of master robot, the base coordinate system of slave robot, the coordinate system of the depth camera mounted on the slave robot and the coordinate system of the Optical See-Trough Head-Mounted Display (OST-HMD). Since the depth camera is mounted on the end of the slave robot, it can be transformed with the base coordinate system of slave robot through forward kinematics. The transformation between the OST-HMD and the base coordinate system of master robot can be achieved by scanning an QR code through the mixed reality device.

In this scheme, the OST-HMD used in this invention is Microsoft HoloLens2, and the invention uses a Universal Windows Platform (UWP) and a Mixed Reality Toolkit (MRTK) of Unity3D to realize QR code recognition, speech and gesture recognition and build virtual scenes. The coordinate system in Unity3D is a left-handed coordinate system, however, the other coordinate systems are all right-handed systems. Through the combination of virtual and real, a digital twin of the slave robot is projected to the same position as the master robot, and a motion of the two robots is synchronized, so that joint angles of virtual and real objects are also synchronized. Through this method, when the master robot moves, the digital twin that coincides with it also moves together. In addition, because the digital twin and the virtual scene are both virtual objects, there is no incorrect occlusion relationship between them, which solves the occlusion problem. In order to facilitate data exchange, two PCs and HoloLens are connected to each other within the same LAN. One PC is used to control the teleoperation robot system, and is used for collection and processing of depth information. The other PC is used to create and manage the virtual scenes projected to HoloLens in Unity3D. Fast synchronization of virtual and real robots can be realized through UDP protocol, and in order to avoid packet loss, a file transfer protocol (FTP) is used to achieve efficient and fast point clouds data transmission.

Compared with the existing technology, the beneficial effects of this scheme are:

By completely corresponding visual feedback to force feedback and guidance, and completely corresponding virtual scene to real scene, the invention greatly enhances the immersion of the operator in the teleoperation system, reduces the learning cost and work burden, and skillfully solves the occlusion problem in the mixed reality technology.

DETAILED DESCRIPTION OF THE INVENTION

Figure 1:
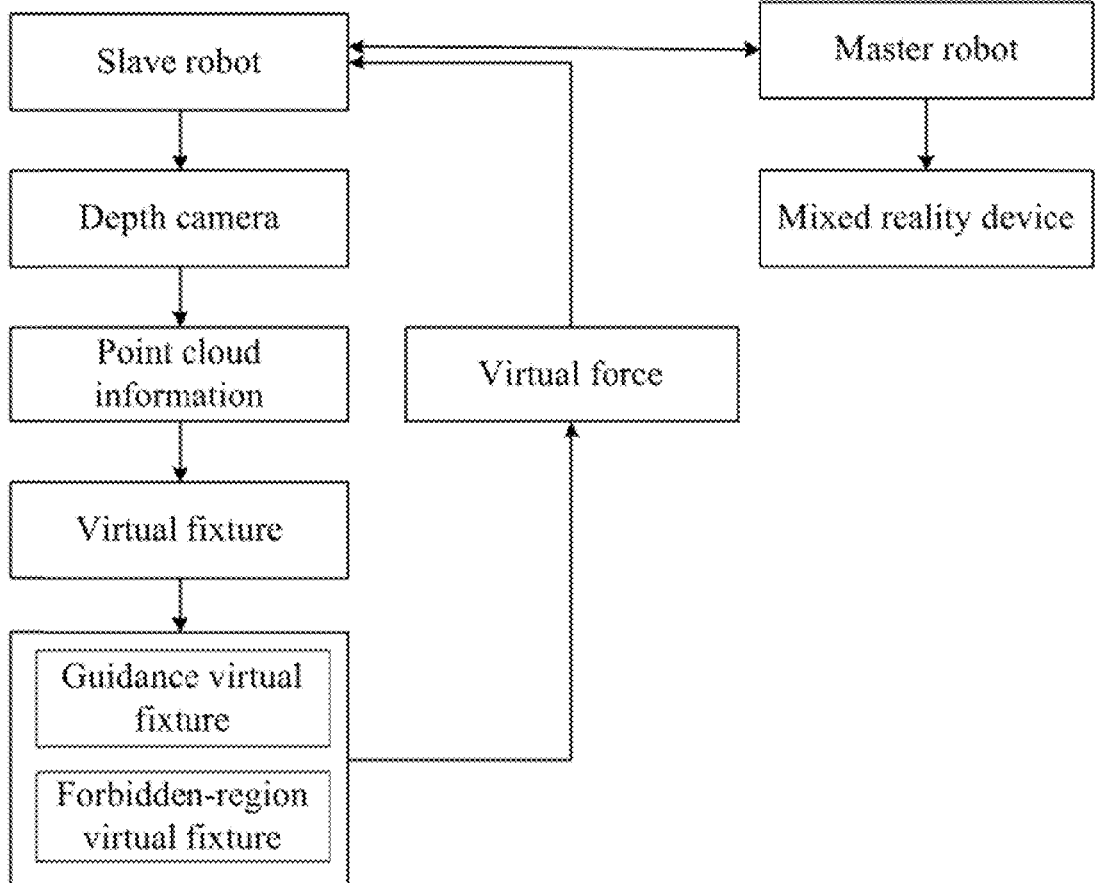
FIG. 1 is the flow chart of the system in the embodiment of the invention.
Figure 2:
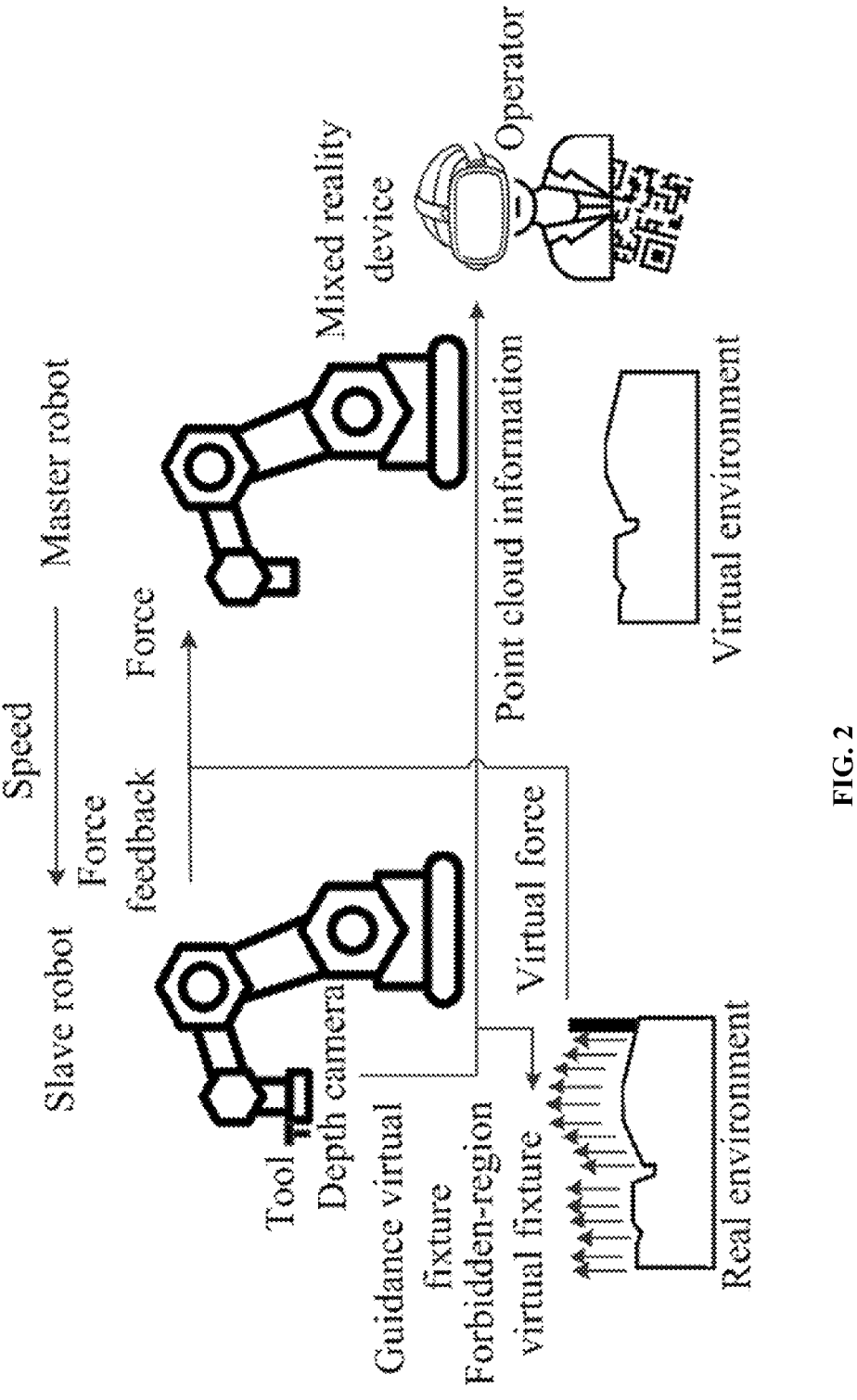
FIG. 2 is the working flow chart of the system in the embodiment of the invention.
Figure 3:
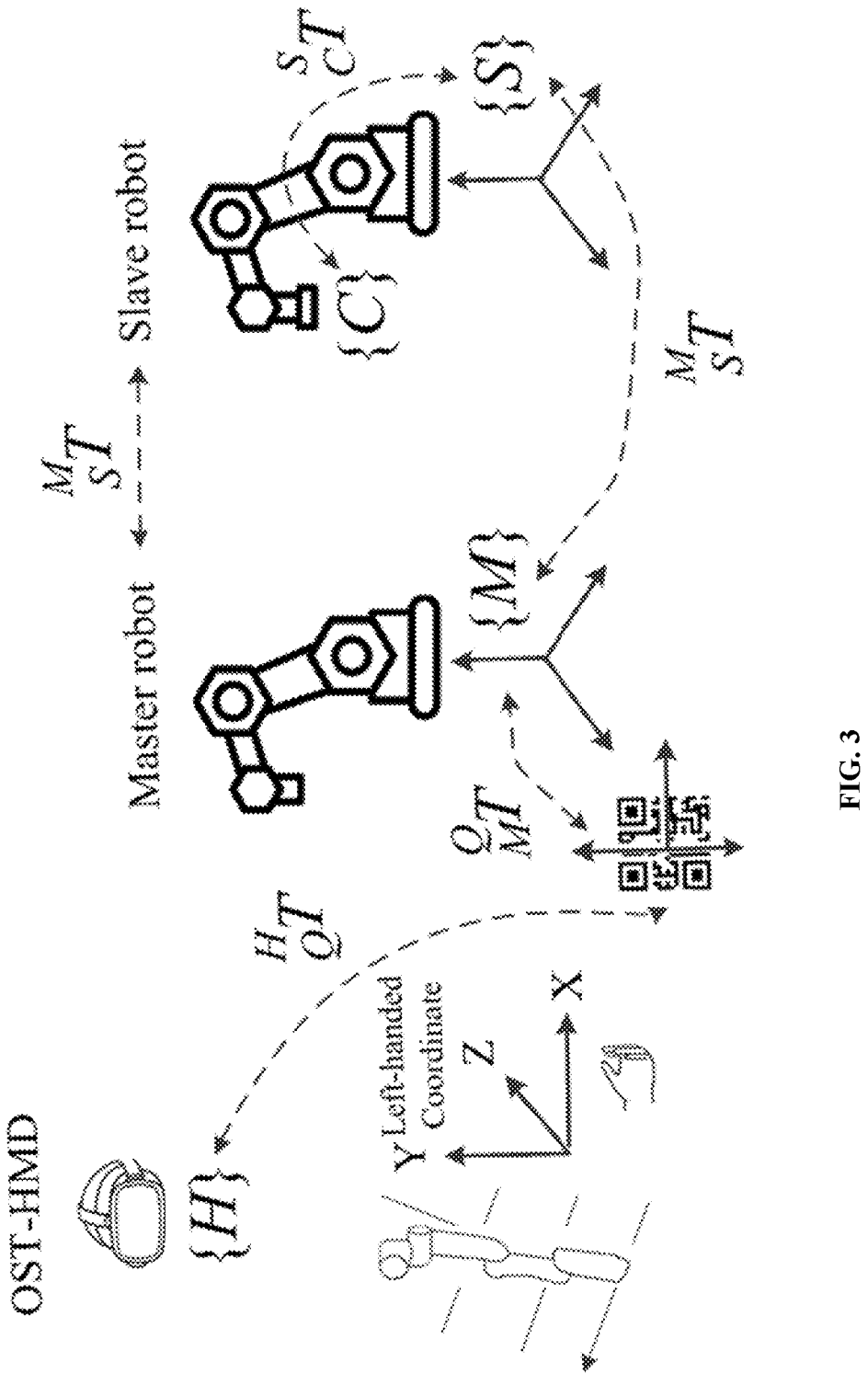
FIG. 3 is the coordinate transformation diagram of the system in the embodiment of the invention.
Figure 4:
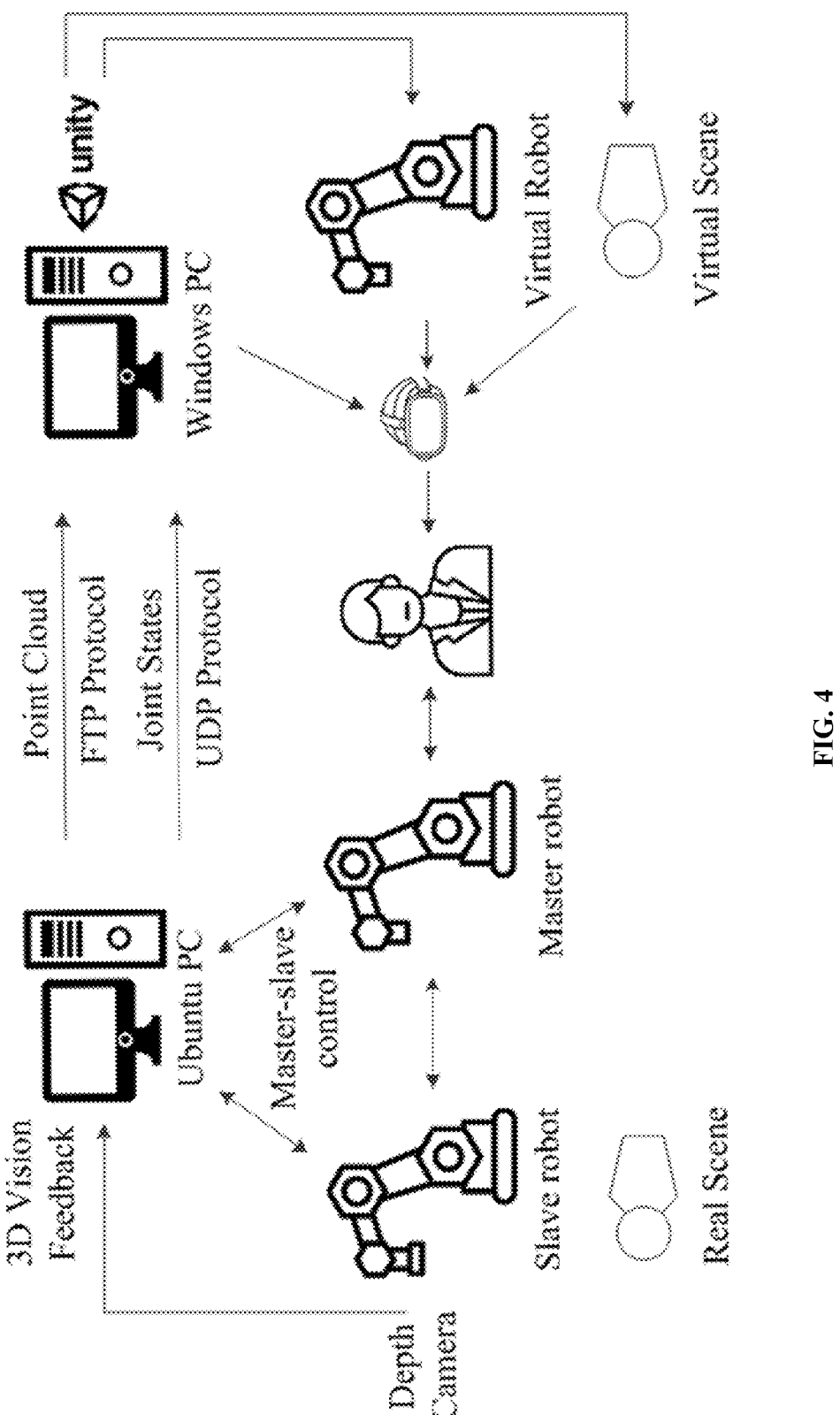
FIG. 4 is the communication flow chart of the system in the embodiment of the invention.

In order to make the personnel in the technical field better understand the invention scheme, the following will further describe the technical scheme of the invention in detail in combination with the embodiment and drawings of the invention. Obviously, the embodiment described here is only part of the embodiments of the invention, not all of the embodiments. Based on the embodiment of this invention, all other embodiments obtained by ordinary technicians in this field without making creative labor should belong to the protection scope of this invention.

It should be noted that the embodiment and the characteristics of the embodiment in the invention can be combined with each other without conflict. The following will explain the invention in detail with the embodiment.

EMBODIMENT

The scheme provided by the embodiment of the invention is described in the above invention content, it provides a master-slave teleoperation robot system based on force mixed reality, which comprises a master robot and a slave robot, the master-slave device can also use isomeric robot, for example, the master robot can be a force feedback device, but an additional space mapping is needed.

The mixed reality device at master side is used to receive information and produce a virtual environment.

The end of the slave robot is equipped with a depth camera, the depth camera is used to collect point cloud information of the real environment and send the information to the mixed reality device in real time, the point cloud information is used to produce a virtual fixture, the virtual fixture is used to produce a virtual force which is applied to the slave robot, the virtual force comprises a guiding force and a prohibiting force, the virtual force interacts with the actual environment interaction force to guide and norm the operator's behavior.

In this embodiment, the point cloud information of the real environment is collected by the depth camera during an actual operation process, and sent to the mixed reality device in real time to produce the virtual environment. At the same time, the point cloud information is also used to produce the virtual fixture to provide the guiding force and the prohibiting force, and this virtual force interacts with the actual environmental interaction force of the slave robot, which can guide and norm the operator's behavior. After the point cloud information of the real environment collected by the depth camera, it is transformed to the base coordinate system of the slave robot and sent to the master robot in real time. The master robot and the slave robot are in an isomorphic master-slave configuration, therefore, in the mixed reality device, the point cloud information can be directly projected to the corresponding position in the base coordinate of the master robot. In this configuration, the virtual environment of the master robot corresponds to the real environment of the slave robot, and the force guidance of the virtual fixture also corresponds to the visual feedback of the mixed reality. This consistency greatly enhances operator's immersion in the process of master-slave teleoperation.

The virtual fixture comprises a forbidden-region virtual fixture (FRVF) and a guidance virtual fixture (GVF), through an artificial potential field, the point cloud information of a prohibited area of the real environment is collected to produce the forbidden-region virtual fixture (FRVF); the guidance virtual fixture (GVF) is a human-robot interaction motion path that the operator wants to achieve.

In this embodiment, the virtual fixture refers to a virtual tool created in a computer simulation environment, which is used to simulate the clamping and positioning functions in the actual scene. The technology simulates the operation of a fixture in a virtual world through computer-produced virtual forbidden regions or guidance areas, providing users with intuitive force guidance to perform tasks more accurately and with fewer errors.

The point cloud information is the three-dimensional information of the real environment collected by the depth camera. After transformed to the base robot coordinate system, the point cloud information is sent to the master side in real time, the master robot and the slave robot are in an isomorphic master-slave configuration, therefore, in the mixed reality device, the point cloud information can be directly projected to the corresponding position in the base coordinate of the master robot.

In this embodiment, after collected by the camera, the three-dimensional information of the point cloud information of the real environment can be transformed to the base coordinate system of master robot and sent to the master robot in real time, due to the isomorphism of the master robot and the slave robot, in the mixed reality device, the point cloud information can be directly projected to corresponding position in the base coordinate of the master robot. In this configuration, the virtual environment of the master robot corresponds to the real environment of the slave robot, and the force guidance of the virtual fixture corresponds to the visual feedback of the mixed reality. This consistency greatly enhances operator's immersion in the process of master-slave teleoperation.

The coordinate system of the master-slave teleoperation robot system comprises the base coordinate system of master robot, the base coordinate system of slave robot, the coordinate system of the depth camera mounted on the slave robot and the coordinate system of the Optical See-Trough Head-Mounted Display (OST-HMD). Since the depth camera is mounted on the end of the slave robot, it can be transformed with the base coordinate system of slave robot through forward kinematics. The transformation between the OST-HMD and the base coordinate system of master robot can be achieved by scanning an QR code through the mixed reality device.

In this scheme, the OST-HMD used in this invention is Microsoft HoloLens2, and the invention uses the Universal Windows Platform (UWP) and Mixed Reality Toolkit (MRTK) of Unity3D to realize QR code recognition, speech and gesture recognition and build virtual scenes. The coordinate system in Unity3D is a left-handed coordinate system, however, the other coordinate systems are all right-handed systems. Through the combination of virtual and real, the digital twin of the slave robot is projected to the same position as the master robot, and the motion of the two robots is synchronized, so that joint angles of virtual and real objects are also synchronized. Through this method, when the master robot moves, the digital twin that coincides with it also moves together. In addition, because the digital twin and the virtual scene are both virtual objects, there is no incorrect occlusion relationship between them, which solves the occlusion problem. In order to facilitate data exchange, two PCs and HoloLens are connected to each other within the same LAN. One PC is used to control the teleoperation robot system, and is used for collection and processing of depth information. The other PC is used to create and manage the virtual scenes projected to HoloLens in Unity3D. Fast synchronization of virtual and real robots can be realized through UDP protocol, and in order to avoid packet loss, the file transfer protocol (FTP) is used to achieve efficient and fast point clouds data transmission.

The above embodiment is only an explanation of the invention, and it is not a restriction of the invention. After reading the instruction, the technical technicians in this field can make the modification of the embodiment without creative contribution according to their needs, but as long as the content of embodiment is within the scope of the claim of the invention, it is protected by patent law.

What is claimed is:

1. A master-slave teleoperation robot system based on force mixed reality, comprising a master robot and a slave robot, wherein the master robot is connected with a mixed reality device, which is used to receive point cloud information of a real environment and produce a virtual environment based on the point cloud information in the mixed reality device; an end of the slave robot is equipped with a depth camera, the depth camera is used to collect the point cloud information and send the point cloud information to the mixed reality device in real time, the point cloud information is also used to produce a virtual fixture, the virtual fixture is used to produce a virtual force which is applied to the slave robot, the virtual force comprises a guiding force and a prohibiting force, the virtual force interacts with an actual environment interaction force at a slave side to guide and norm an operator's behavior at a master side; wherein the mixed reality device projects a digital twin of the slave robot to a position coinciding with the master robot, and motions of the slave robot and the master robot are synchronized such that joint angles of the digital twin and the master robot are synchronized, thereby eliminating incorrect occlusion relationships between the master robot and the virtual environment projected in the mixed reality device.

2. The master-slave teleoperation robot system based on force mixed reality according to claim 1, wherein the virtual fixture comprises a forbidden-region virtual fixture (FRVF) and a guidance virtual fixture (GVF), through an artificial potential field, the point cloud information of a prohibited area of the real environment is collected to produce the FRVF; the GVF is a human-robot interaction motion path that the operator wants to achieve.

3. The master-slave teleoperation robot system based on force mixed reality according to claim 1, wherein the point cloud information is a three-dimensional information of the real environment collected by the depth camera, after the point cloud information is transformed to a robot base coordinate system, the point cloud information is sent to the master robot in real time, the master robot and the slave robot are in an isomorphic master-slave configuration, therefore, in the mixed reality device, the point cloud information is directly projected to a corresponding position in a base coordinate of the master robot.

4. The master-slave teleoperation robot system based on force mixed reality according to claim 3, wherein a coordinate system of the master-slave teleoperation robot system comprises a base coordinate system of the master robot, a base coordinate system of the slave robot, a coordinate system of the depth camera mounted on the slave robot and a coordinate system of an Optical See-Through Head-Mounted Display (OST-HMD).

* * * * *